UNITED STATES PATENT OFFICE.

GUSTAV CURT SCHUMANN AND GERHARD STEIMMIG, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF ALCOHOLS.

1,410,223. Specification of Letters Patent. Patented Mar. 21, 1922.

No Drawing. Application filed August 25, 1921. Serial No. 495,388.

*To all whom it may concern:*

Be it known that we, GUSTAV CURT SCHUMANN and GERHARD STEIMMIG, citizens of Germany, residing at Ludwigshafen-on-the-Rhine, Germany, have invented new and useful Improvements in the Manufacture of Alcohols, (for which we have made application in Germany February 9, 1920,) of which the following is a specification.

The present invention relates to an improvement in the manufacture of alcohols by reduction of the aldehydes by means of hydrogen in the presence of catalysts. We have discovered that the catalytic reduction of aldehydes can be carried out with excellent results by employing a copper containing catalyst which has been prepared by reduction of a copper compound obtained below glowing heat, the reduction being preferably carried out at a low temperature, say below about 300 degrees centigrade. Catalysts containing finely divided copper prepared from precipitated copper compounds are very suitable, but other copper compounds, such as copper salts, or oxids, obtained below red heat, can also serve for the preparation of the catalyst.

Copper catalysts thus prepared have the essential advantage of enabling the reduction of the aldehydes being performed at as low temperatures as about 200 degrees centigrade and still less, at which temperature the property of the copper of causing the reverse reaction, viz: splitting off hydrogen from the alcohols, is not effective. Apart from the much lower cost of a copper catalyst as compared with the usual nickel contact masses, the copper catalyst possesses the important advantage that copper oxids can be reduced at the low reaction temperature employed according to this invention and that an oxidation of the contact mass during the operation by traces of oxygen is thus rendered impossible.

In order to further illustrate the nature of our invention and the manner in which the same is carried into effect, the following samples are given, to which however the invention is not confined.

*Example 1.*

A contact mass is prepared by precipitating a hot solution of a copper salt by means of caustic alkali lye, mixing the precipitate with granulated pumice stone and reducing the cupric hydroxid with hydrogen at a temperature of say 200 degrees centigrade. A mixture of vaporized acetaldehyde (either monomeric or polymeric) with an excess of hydrogen is then passed through the mass while maintaining a temperature of about 180 degrees centigrade. Ethyl alcohol is formed with a very good yield.

*Example 2.*

Copper formate is supplied to pumice, treated with hydrogen at about from 200 degrees to 250 degrees centigrade and the contact mass obtained employed for the production of alcohol in the aforedescribed manner.

*Example 3.*

Copper bronze color or other powdered copper is brought on to pumice with an addition of water glass solution or colloidal silica, then oxidized with air at 200 degrees centigrade and again reduced at from 200 degrees to 250 degrees centigrade, whereupon the mass is used for the manufacture of alcohol as described. Other activators may be used instead of water glass or colloidal silica.

*Example 4.*

Lumps of malachite are reduced at from 200 degrees to 250 degrees centigrade and can then also serve for the preparation of ethyl alcohol from acetaldehyde or paraaldehyde with excellent result.

*Example 5.*

Formaldehyde solution of about 40 per cent is distilled and the vapor passed, at about 200 degrees centigrade, over a contact mass, prepared according to any of these examples. Polymers of formaldehyde may also be employed.

*Example 6.*

Benzaldehyde vapors together with hydrogen are passed, at a temperature up to 200 degrees centigrade, over a contact mass obtained as described in the above examples. Benzyl alcohol is produced with good yield.

We claim:—

1. The process of manufacturing alcohols by passing aldehyde vapors and hydrogen over a copper contact mass prepared by the reduction of a copper compound which has been obtained below glowing heat.

2. The process of manufacturing alcohols by passing aldehyde vapors and hydrogen over a copper contact mass prepared by the reduction, at a temperature below about 300 degrees centigrade, of a copper compound, which has been obtained below glowing heat.

3. The process of manufacturing alcohols by passing aldehyde vapors and hydrogen over a copper contact mass prepared by the reduction, at a temperature below about 300 degrees centigrade, of a precipitated copper compound.

4. The process of manufacturing ethyl alcohol by passing acetaldehyde vapors and hydrogen over a copper contact mass prepared by the reduction, at a temperature below about 300 degrees centigrade, of a precipitated copper compound.

In testimony whereof we have hereunto set our hands.

GUSTAV CURT SCHUMANN.
GERHARD STEIMMIG.